April 5, 1960  G. SCHULER  2,931,126
FLY SWATTER
Filed June 25, 1959
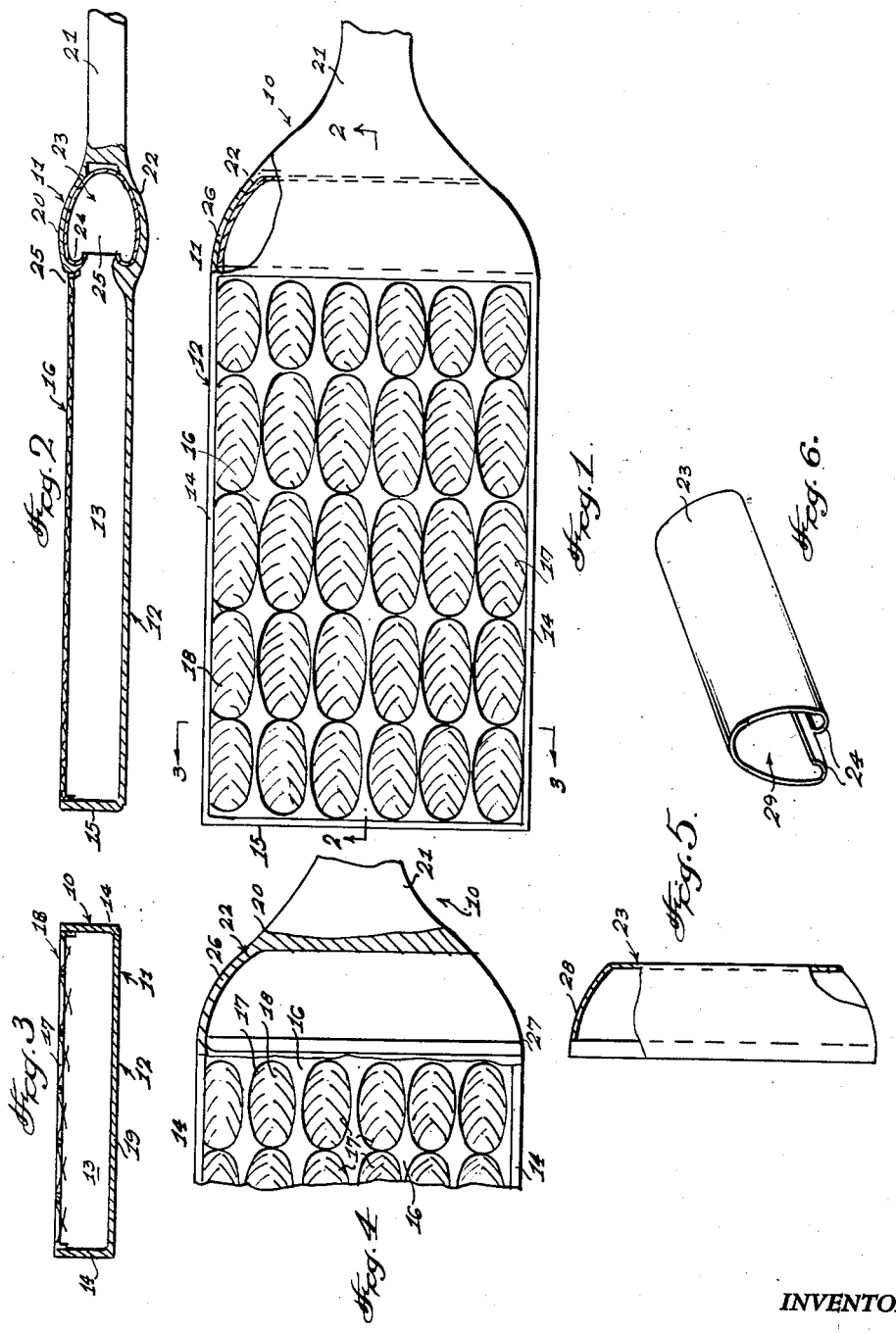
INVENTOR.
GEORGE SCHULER
BY Victor J. Evans & Co.
ATTORNEYS

United States Patent Office 2,931,126
Patented Apr. 5, 1960

2,931,126

FLY SWATTER

George Schuler, Dutton, Mont.

Application June 25, 1959, Serial No. 822,892

4 Claims. (Cl. 43—137)

This invention relates to a fly swatter.

The object of the invention is to provide a swatter for use with flies or other insects, and wherein the swatter is constructed so that the insects can be trapped alive and collected in a container or tray, and wherein the tray can be readily removed and emptied when desired.

Another object of the invention is to provide a fly swatter which is constructed so that flies will not have to be picked up by hand after they have been swatted.

A further object of the invention is to provide a fly swatter which is extremely simple and inexpensive to manufacture.

Other objects and advantages will be apparent during the course of the following description.

In the accompanying drawing, forming a part of this application, and in which like numerals are used to designate like parts throughout the same:

Figure 1 is a fragmentary plan view of the fly swatter of the present invention, with parts broken away and in section.

Figure 2 is a sectional view taken on line 2—2 of Figure 1.

Figure 3 is a sectional view taken on line 3—3 of Figure 1.

Figure 4 is a fragmentary sectional view illustrating certain constructional details of the present invention.

Figure 5 is an elevational view of the removable container or tray, and with parts broken away and in section.

Figure 6 is a perspective view of the removable tray.

Referring in detail to the drawing, the numeral 10 indicates the fly swatter of the present invetnion which is shown to comprise a frame 11, and the frame 11 is provided with a body portion 12 which is hollow so as to define an inner chamber 13, Figure 2. The body portion 12 includes spaced parallel side walls 14 as well as an end wall 15 and there is also provided a back wall 19. The numeral 16 indicates a wall member which is arranged in spaced parallel relation with respect to the back wall 19, and the wall member 16 is provided with a plurality of spaced apart oval-shaped openings or apertures 17, and bristles 18 are affixed to the wall member 16 contiguous to the openings 17.

The fly swatter further includes a tapered shoulder 20 which has a handle 21 extending therefrom. The shoulder 20 is provided with a chamber or space 22, and the numeral 23 indicates a container or tray which is removable or slidable in the space 22. The tray 23 is adapted to receive the insects or flies which have been swatted, and the tray 23 is provided with curved portions 24 that are adapted to engage ridges 25 so as to maintain the tray in its proper position in the shoulder. One end of the shoulder 20 adjacent the space 22 may be closed as at 26, while the other end as indicated by the numeral 27 may be open so that the tray 23 can be readily removed or inserted through the opening 27. The tray 23 may have a closed end 28 as well as an open end 29.

From the foregoing, it is apparent that there has been provided an improved fly swatter, and in use the user is adapted to lift the handle 21 to swat the flies and insects along the wall member 16. Due to the provision of the openings 17, it will be seen that these insects will be stunned by the hairs or bristles 18 and these stunned insects or flies will pass through the openings 17 and into the chamber or space 13. Then, by tilting the fly swatter to a generally vertical position the insects or flies will pass into the tray 23. The bristles 18 also help insure that the flies cannot actually escape from the interior of the fly swatter after they are caught therein. When the tray 23 becomes full, or when it is to be emptied for any desired reason, the tray 23 can be readily removed from the space 22, as for example as shown in Figures 4 and 5, and the open end 27 permits the tray to be readily inserted or removed as desired.

The parts can be made of any suitable material and in different shapes or sizes. The tray 23 fits snugly in the space 22 and due to the provision of the curved portions 24 of the tray 23 which engage the lips or ridges 25, the tray will be maintained or retained in its proper position.

The bristles 18 are yieldable or flexible so that the flies can pass therethrough after the flies have been swatted.

It will be seen that according to the present invention the insects can be trapped alive and wherein insects will be deposited in a container or tray which can be taken out and emptied and wherein after the insects have been swatted they do not have to be picked up by hand because they will drop through an opening into the tray or container 23. The insects are forced through the oval-shaped openings when hit with the swatter and these openings may be of a suitable size such as approximately one inch long and a half inch wide. The bristles are made of a suitable hair like material which is sufficiently soft so that as the insect is swatted, the insect will be forced through the bristles and then the bristles will spring back to trap the insect and a light down stroke will send the insect into the container. The bristles may have their ends fastened under the top side or front side 16 of the fly swatter.

Minor changes in shape, size and rearrangement of details coming within the field of the invention claimed may be resorted to in actual practice, if desired.

I claim:

1. In a fly swatter, a frame including a hollow body portion embodying a back wall, spaced parallel side walls and an end wall, a wall member arranged in spaced parallel relation with respect to said back wall, said wall member being provided with a plurality of spaced apart oval-shaped openings therein, bristles contiguous to said openings, said fly swatter further including a tapered shoulder contiguous to said body member, a handle extended from said shoulder, and a tray slidably supported in said shoulder.

2. In a fly swatter, a frame including a hollow body portion embodying a back wall, spaced parallel side walls and an end wall, a wall member arranged in spaced parallel relation with respect to said back wall, said wall member being provided with a plurality of spaced apart oval-shaped openings therein, bristles contiguous to said openings, said fly swatter further including a tapered shoulder contiguous to said body portion, a handle extended from said shoulder, and a tray slidably supported in said shoulder, said tray being provided with curved portions, and ridges in said shoulder for engagement with said curved portions.

3. In a fly swatter, a frame including a hollow body portion embodying a back wall, spaced parallel side walls and an end wall, a wall member arranged in spaced parallel relation with respect to said back wall, said wall member being provided with a plurality of spaced apart oval-shaped openings therein, bristles contiguous to said openings, said fly swatter further including a tapered shoulder contiguous to said body portion, a handle extended from said shoulder, and a tray slidably supported in said shoulder, said tray being provided with curved portions, and ridges in said shoulder for engagement with said curved portions, the insects such as flies after being swatted passing through the oval-shaped openings and past the bristles and whereby the tray will receive the insects such as flies therein.

4. In a fly swatter, a frame inculding a hollow body portion provided with a plurality of openings, bristles attached to said body and contiguous to said openings, and a removable tray removably disposed in said frame and adapted to receive insects which pass through the openings.

References Cited in the file of this patent

UNITED STATES PATENTS 2,545,072    Denman _____ Mar. 13, 1951